(12) United States Patent
Kao et al.

(10) Patent No.: US 9,311,440 B2
(45) Date of Patent: Apr. 12, 2016

(54) SYSTEM AND METHOD OF ELECTROMIGRATION AVOIDANCE FOR AUTOMATIC PLACE-AND-ROUTE

(75) Inventors: Jerry Kao, Taipei (TW); King-Ho Tam, Hsinchu (TW); Meng-Xiang Lee, Dounan Township (TW); Li-Chung Hsu, Taichung (TW); Chi-Yeh Yu, Hsinchu (TW); Chung-Min Fu, Chungli (TW); Chung-Hsing Wang, Baoshan Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 628 days.

(21) Appl. No.: 13/468,055

(22) Filed: May 10, 2012

(65) Prior Publication Data

US 2013/0304449 A1 Nov. 14, 2013

(51) Int. Cl.
*G06F 17/50* (2006.01)

(52) U.S. Cl.
CPC ........ *G06F 17/5072* (2013.01); *G06F 17/5077* (2013.01); *G06F 2217/76* (2013.01)

(58) Field of Classification Search
CPC .......... H01L 2924/0002; H01L 2924/00; H01L 2924/00014; H01L 23/5286; H01L 2224/05001; H01L 2224/05624; H01L 2224/45124; H01L 2224/45144; H01L 2224/45147; H01L 27/0207; H01L 2924/13091; H01L 23/5226; H01L 2224/02166; H01L 2224/05093; H01L 2224/05095; H01L 2224/48624; H01L 2224/48724; H01L 2224/48824; H01L 22/32; H01L 22/34; H01L 23/5283; H01L 23/5329; H01L 23/60; H01L 24/03; H01L 24/05; G06F 17/5072

USPC ........... 703/1, 15, 17, 14; 716/112, 111, 124, 716/130, 132, 136; 257/203, 207, 211, 499, 257/751
See application file for complete search history.

(56) References Cited

U.S. PATENT DOCUMENTS

| | | | | |
|---|---|---|---|---|
| 5,404,310 A * | 4/1995 | Mitsuhashi | ......... | G06F 17/5022 716/112 |
| 5,835,378 A * | 11/1998 | Scepanovic | ......... | G06F 17/5072 700/103 |
| 6,586,828 B2 * | 7/2003 | Buffet | ................ | H01L 23/5286 257/207 |
| 6,857,113 B2 * | 2/2005 | Gentry | ............... | G06F 17/5036 716/113 |
| 7,114,139 B2 | 9/2006 | Kabuo | | |
| 7,165,232 B2 | 1/2007 | Chen et al. | | |
| 7,315,992 B2 * | 1/2008 | Bhooshan | ........... | G06F 17/5036 716/112 |
| 7,786,513 B2 * | 8/2010 | Tsutsumi | ..................... | 257/203 |

(Continued)

OTHER PUBLICATIONS

Idgunji et al. Design Planning Strategies to Improve Physical Design Flows—Floorplanning and Power Planning, Synopsys, Aug. 2003.*

(Continued)

*Primary Examiner* — Carlos Ortiz Rodriguez
*Assistant Examiner* — Scott S Cook
(74) *Attorney, Agent, or Firm* — Duane Morris LLP

(57) ABSTRACT

A method includes identifying at least one local power segment of a circuit, estimating at least one performance parameter of the at least one power segment based on a computer-based simulation of the circuit, and changing a design of the circuit based on at least one electromigration avoidance strategy if the at least one parameter is greater than or equal to a threshold value. A data file representing the circuit is stored if the at least one parameter is less than the threshold value.

20 Claims, 4 Drawing Sheets

(56) References Cited

U.S. PATENT DOCUMENTS

| | | |
|---|---|---|
| 8,046,728 B2 | 10/2011 | Liu |
| 2006/0239102 A1* | 10/2006 | Saita et al. .................... 365/226 |
| 2007/0245285 A1* | 10/2007 | Wang et al. .................... 716/10 |
| 2009/0013290 A1* | 1/2009 | Keinert et al. .................... 716/4 |
| 2009/0031264 A1* | 1/2009 | Rittman et al. .................... 716/5 |
| 2009/0113356 A1* | 4/2009 | Rewienski et al. ............... 716/2 |
| 2009/0224356 A1* | 9/2009 | Chandra .................... 257/499 |
| 2010/0055184 A1* | 3/2010 | Zeitels et al. ................ 424/484 |
| 2012/0025273 A1* | 2/2012 | Lu et al. ........................ 257/211 |
| 2012/0110530 A1* | 5/2012 | Yang et al. .................... 716/112 |

OTHER PUBLICATIONS

Xu, L., Electromigration Failure with Thermal Gradient Effect in SnAgCu Solder Joints with Various UBM, IEEE, 2009 Electronic Components and Technology Conference.*

Nguyen, H.V., Effect of Thermal Gradient on the Electromigration Lieftime in Power Electronics, IEEE, $42^{nd}$ Annual International Reliability Physics Symposium, Phoenix, 2004.*

Dandu, P., Some Remarks on Finite Element Modeling of Electromigration in Solder Joints, IEEE, 2010 Electronic Components and Technology Conference.*

* cited by examiner

SYSTEM AND METHOD OF ELECTROMIGRATION AVOIDANCE FOR AUTOMATIC PLACE-AND-ROUTE

FIELD OF DISCLOSURE

The disclosed system and method relate to integrated circuits. More particularly, the disclosed system and method relate to semiconductor fabrication methods to reduce electromigration.

BACKGROUND

Semiconductor-based integrated circuits ("ICs") are incorporated into many electronic devices. Electromigration ("EM") decreases the reliability of integrated circuits, and eventually may cause degradation or failure of a semiconductor device. EM is caused by transfer of conductive materials through diffusion of ions or atoms. This phenomenon becomes more important in stacked ICs such as 3D-IC when the interconnect width decreases to hundreds or tens of nanometers.

DETAILED DESCRIPTION

Figure 1:
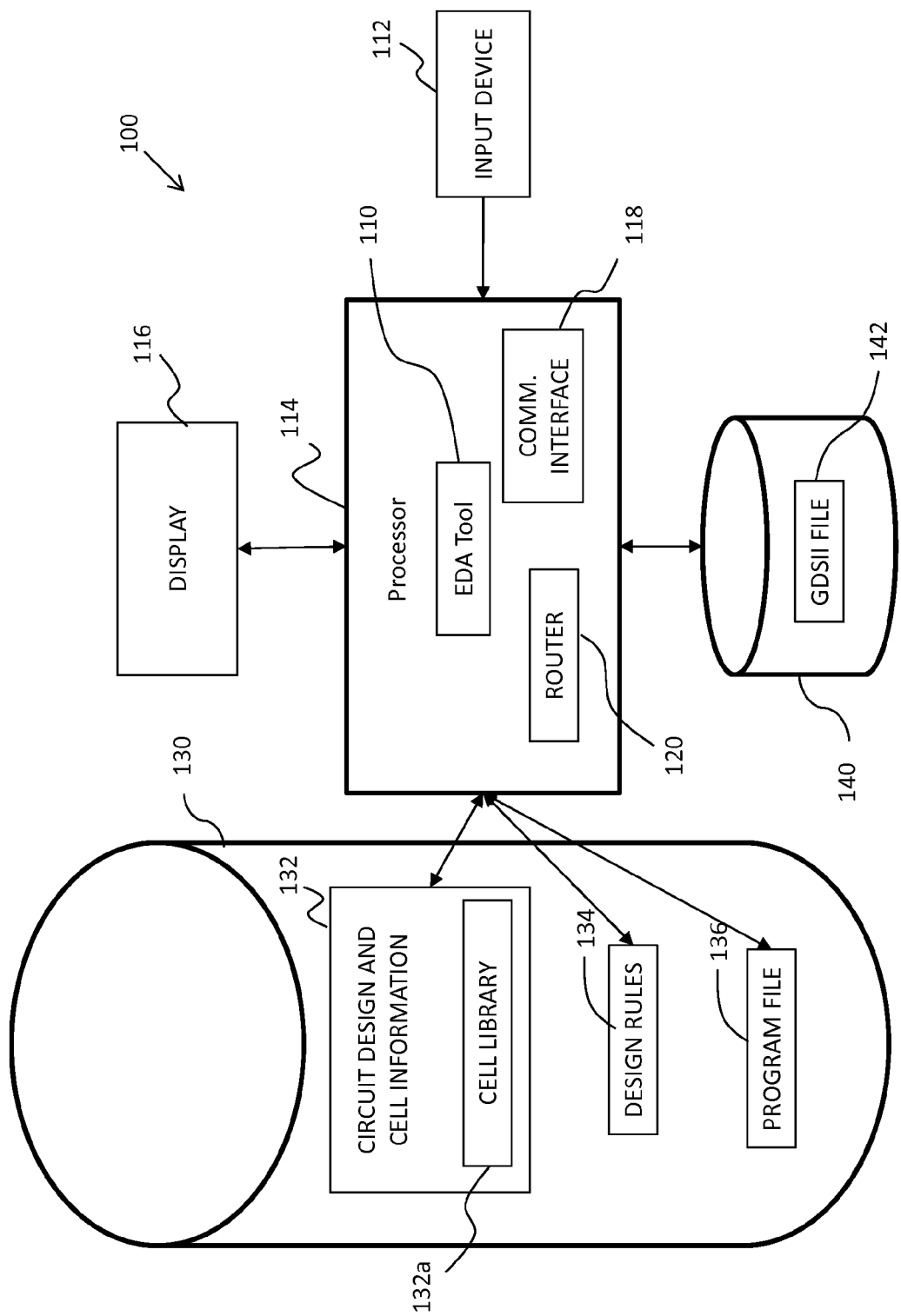
FIG. 1 illustrates one example of a system configured to perform the improved method set forth in FIG. 2.

This description of the exemplary embodiments is intended to be read in connection with the accompanying drawings, which are to be considered part of the entire written description.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The disclosed systems and methods address electromigration ("EM") issues in semiconductor circuits as a multi-bin packing problem. As described in greater detail below, a circuit is divided into local power segments comprising a plurality of individual cells. The performance characteristics of the local power segments, as determined by summing the average performance parameters of each cell, are used identify EM issues. In some embodiments, output load based models, which are estimated based on physical design parameters including output load, toggle rate, pre-characterized internal power and slew rate, and/or average power based models, which are calculated based on the average power consumption in each cell, are used. Once potential EM issues are identified, EM avoidance strategies can be implemented prior to routing and the creation of data files enabling faster circuit design and testing.

FIG. 1 illustrates one example of a system 100 configured to perform the improved method described below. As shown in FIG. 1, system 100 includes an electronic design automation ("EDA") tool 110 such as "IC COMPILER"™, sold by Synopsys, Inc. of Mountain View, Calif., having a place and route tool including a router 120 such as "ZROUTE"™, also sold by Synopsys. Other EDA tools 110 may be used, such as, for example, the "VIRTUOSO" custom design platform or the Cadence "ENCOUNTER"® digital IC design platform along with the "VIRTUOSO" chip assembly router 120, all sold by Cadence Design Systems, Inc. of San Jose, Calif.

The EDA tool 110 is a special purpose computer formed by retrieving stored program instructions 136 from a computer readable storage medium 130, 140 and executing the instructions on a general purpose processor 114. Processor 114 may be any central processing unit ("CPU"), microprocessor, micro-controller, or computational device or circuit for executing instructions. The non-transient machine readable storage medium 130, 140 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130, 140 may store data input by a user such as a circuit design and cell information 132, which may include a cell library 132a, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 218 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels.

Router 120 is capable of receiving an identification of a plurality of cells to be included in a circuit layout, including a list 132 of pairs of cells, selected from the cell library 132a, within the plurality of cells to be connected to each other. Design rules 134 may be used for a variety of processing technologies (e.g., technology greater than, less than, or equal to 45 nm). In some embodiments, the design rules 134 configure the router 120 to locate connecting lines and vias on a manufacturing grid. Other embodiments may allow the router to include off-grid connecting lines and/or vias in the layout.

Figure 2:
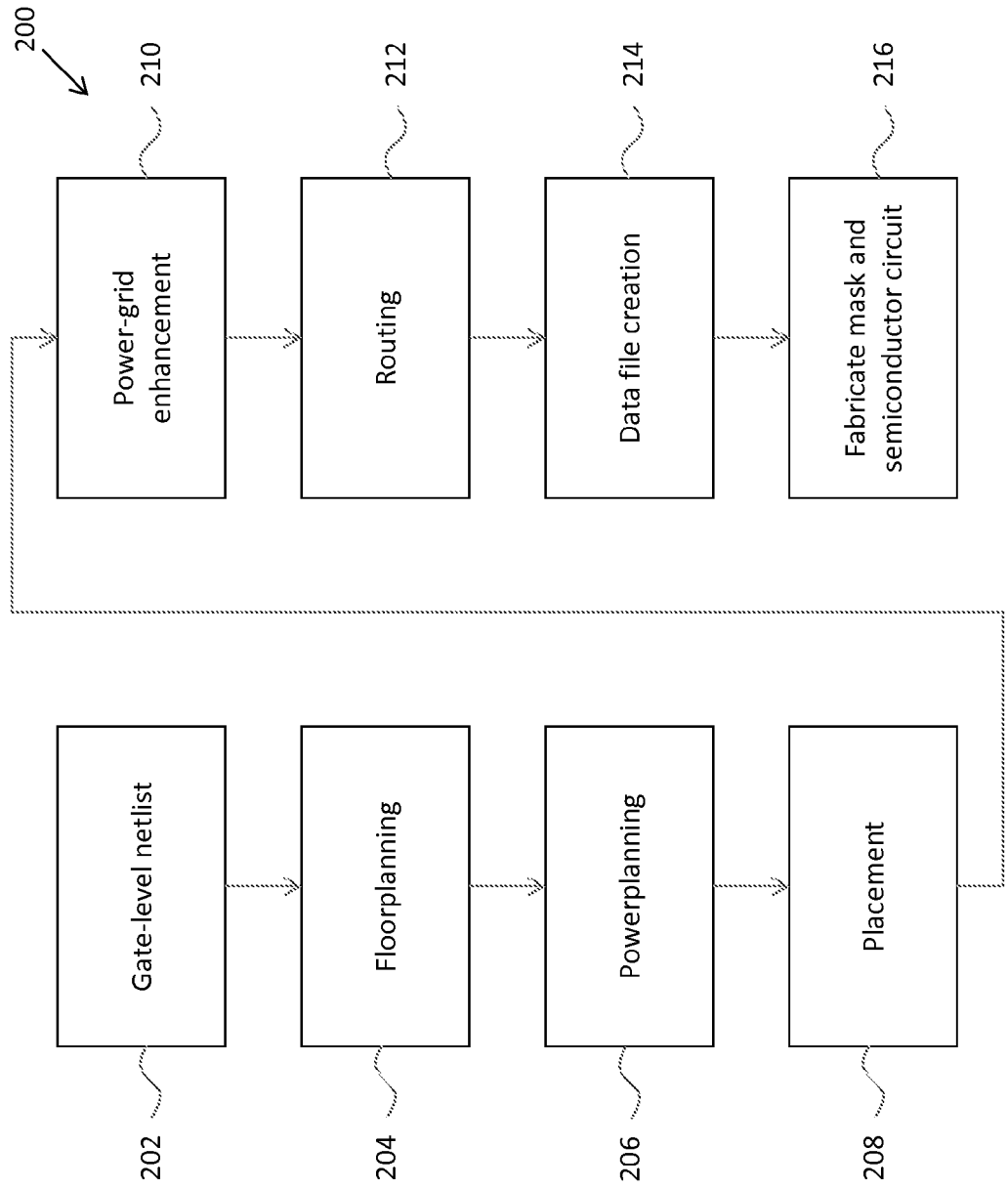
FIG. 2 is a flow diagram of one example of a method of designing and fabricating a semiconductor circuit that is less susceptible to electromigration issues.

FIG. 2 illustrates one example of a method 200 of designing and fabricating a semiconductor-based circuit such that the circuit has reduced electromigration ("EM") issues. At block 202, a gate-level netlist is developed or extracted. As will be understood by one of ordinary skill in the art, the gate-level netlist can be extracted from circuit schematic by processor 114 of system 100.

At block 204, floorplanning for the semiconductor circuit is performed by system 100. One example of circuit floorplanning is described in U.S. Pat. No. 7,114,139 issued to Kabuo, the entirety of which is incorporated by reference herein. In some embodiments, floorplanning includes dividing a circuit into functional blocks, which are portions of the circuit, and identifying the layout for these functional blocks.

At block 206, powerplanning for the semiconductor circuit is performed by system 100. Powerplanning includes identifying the power layout for the functional blocks of the semiconductor circuit. For example, the conductive traces for routing power and ground on the various conductive layers of the semiconductor circuit.

At block 208, system 100 performs placement for the semiconductor circuit. As will be understood by one of ordinary skill in the art, circuit placement includes determining the placement for the electronic components, circuitry, and logic elements. For example, the placement of the transistors, resistors, inductors, logic gates, and other elements of the semiconductor circuit are selected at block 208.

Figure 3:
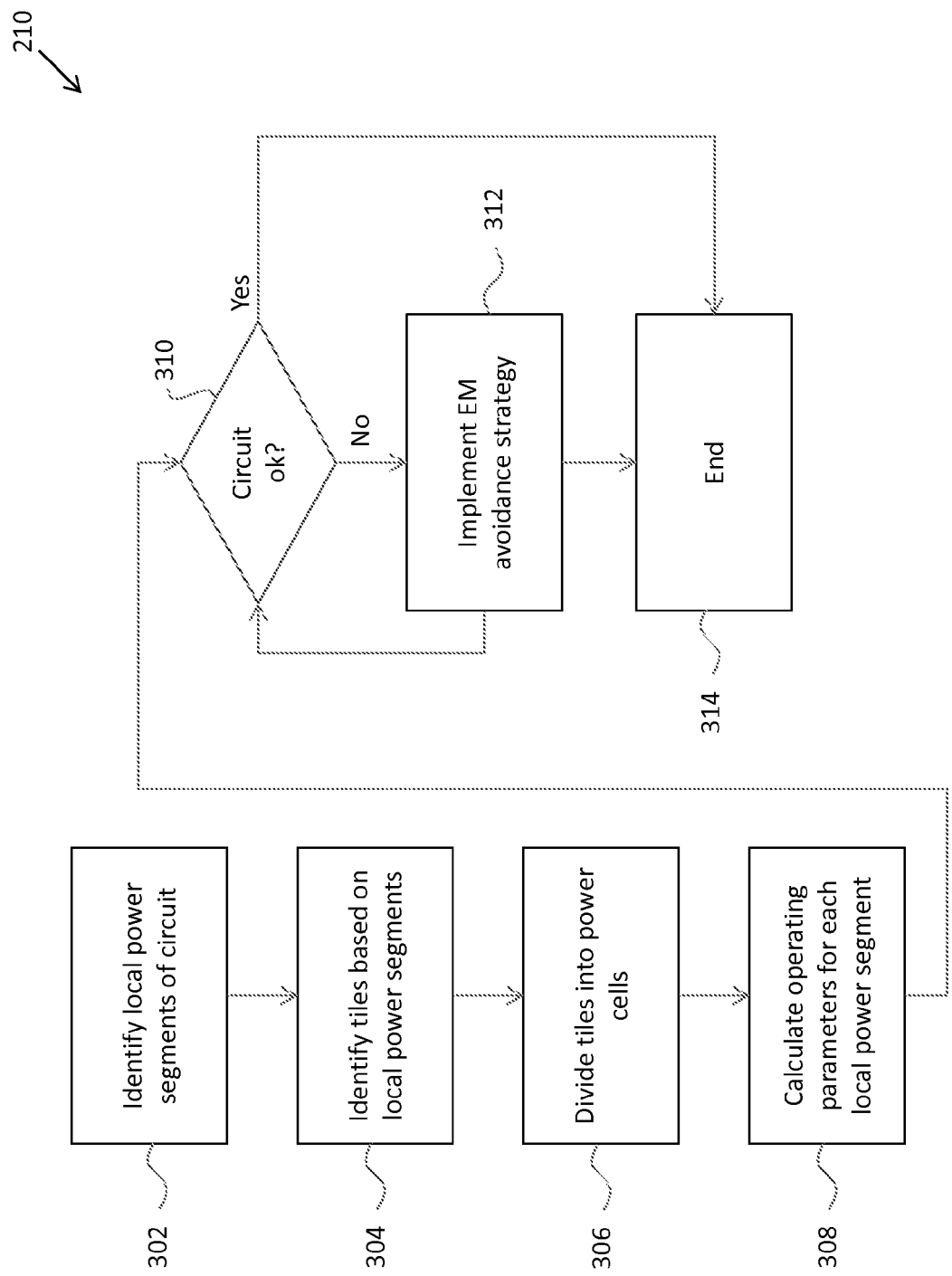
FIG. 3 is a flow diagram of one example of a power grid enhancement method in accordance with the design and fabrication method illustrated in FIG. 2.
Figure 4A:
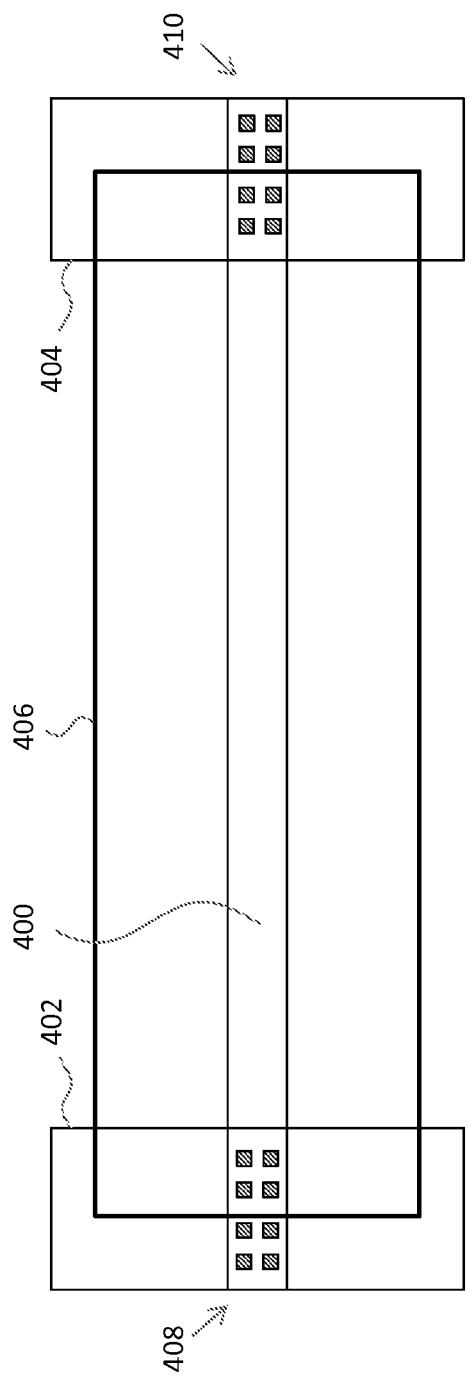
FIGS. 4A and 4B illustrate the dividing of a local power segment into tiles and cells in accordance with the method illustrated in FIG. 3.

At block 210, system 100 performs power-grid enhancement. The method of performing power-grid enhancement at block 210 is described with reference to FIG. 3, which is one example of a method 210 of performing power-grid enhancement. At block 302, the local power segments of the semiconductor circuit are identified. In some embodiments, the local power segments are identified as the area defined by two via structures that are bounded by a higher conductive layer. For example, FIG. 4A illustrates one example of a local power segment 400 disposed between first and second power supply rails 402, 404, which are disposed in one or more conductive layer(s) above the layer in which local power segment 400 is disposed. Via structures 408, 410 respectively couple local power segment 400 to power supply rails, 402, 404.

At block 304, one or more tiles are identified by the local power segments. Referring again to FIG. 4A, tile 406, which in the illustrated embodiment has a rectangular shape, is defined by the area of the semiconductor substrate or active area used to form the devices powered by the local power segment 400. For example, local power segment 400 provides power to the devices located within the area bounded by rectangle 406. Although tile 406 is identified as a rectangle, one of ordinary skill in the art will understand that tile 406 may have other geometries.

Figure 4B:
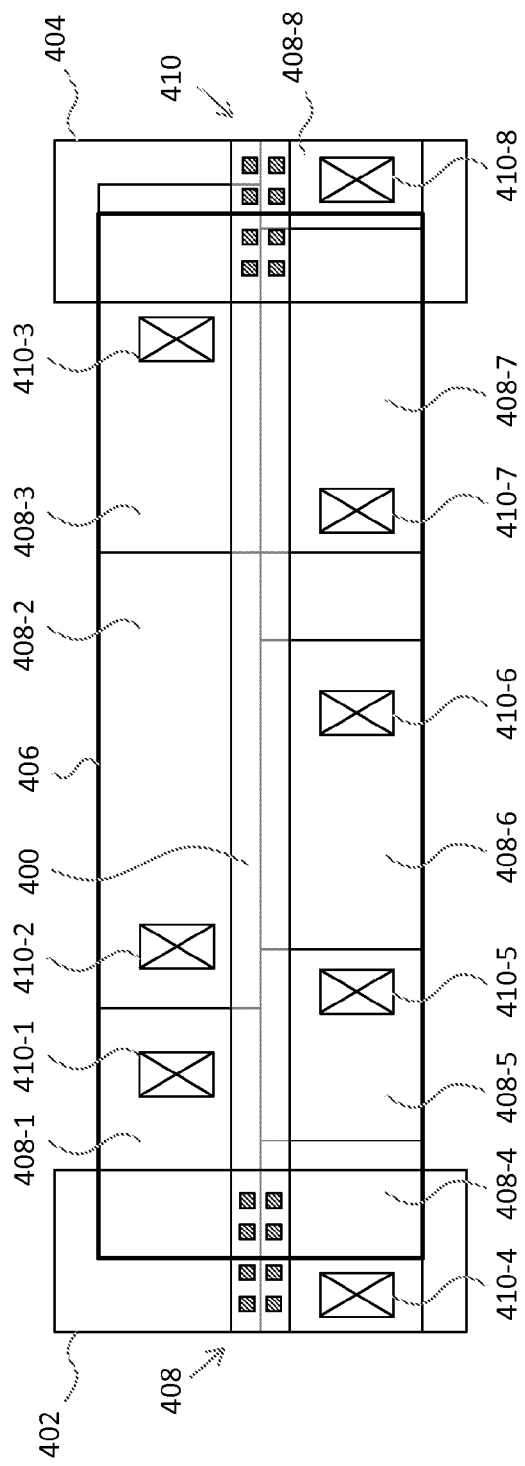

Referring again to FIG. 3, the one or more tiles are divided into one or more cells at block 306. As illustrated in FIG. 4B, tile 406 is divided into eight cells 408-1, 408-2, 408-3, 408-4, 408-5, 408-6, 408-7, and 408-8 (collectively "cells 408") with each cell 408 including a respective output pin 410-1, 410-2, 410-3, 410-4, 410-5, 410-6, 410-7, and 410-8 (collectively "output pins 410" or "pins 410"). In some embodiments, the areas of cells 408 are identified based on the power consumption such that each cell 408 has approximately equal power consumption while the area of each cell 408 may differ from cell to cell. In some embodiments, cells 408 consume different amounts of power and cover different areas.

At block 308, parameters of each local power segment 400 are determined. In some embodiments, for example, the parameters for each local power segment 400 include the average current of each local power segment 400, the total capacitive load for each local power segment 400, and/or the total power consumed for each local power segment 400. As will be understood by one of ordinary skill in the art, the parameters for each local power segment 400 can be estimated by simulating the semiconductor circuit using the expected operating conditions for the semiconductor circuit.

At block 310, system 100 checks the semiconductor circuit to determine if the performance is acceptable. In some embodiments, the check of the semiconductor circuit includes comparing the average current of each power segment 400, Iavg, to a maximum current, Imax, for a conductive wire. As will be understood by one of ordinary skill in the art, the conductive wires or traces used to form and couple together devices of the semiconductor circuit have maximum currents they can support before EM occurs. Such maximum currents are based on several parameters including, but not limited to, the cross-sectional geometry and size of the conductive trace, the operating voltage, and the operating frequency to list but only a few parameters.

In some embodiments, the check of the semiconductor circuit includes comparing the capacitive load per power segment to a threshold value. The capacitive load per power segment can be calculated using the following equation:

$$C_{Load,perPowerSegment} = \Sigma \tau_i \cdot \sigma_{short-circuit,i} C_{Load,i} \qquad \text{Eq. 1}$$

Where, $\tau$ is the toggle rate;

$\sigma_{short-circuit}$ is the short-circuit current scaling factor and equals $I_{VDD}/I_{output}$; and $C_{load}$ is the output capacitive wire load.

The toggle rate, $\tau$, can be estimated from static/dynamic power analysis where signal switching activities are collected. In some embodiments, the toggle rate, $\tau$, is pessimistically estimated by assuming that all signals are 0.1 and all clocks are a 1. The short-circuit current is typically 10-20% of the total current drawn by a standard cell. Consequently, $\sigma_{short-circuit}$ can be conservatively set at 1.2. When timing information, such as input slew rate, are available, the internal power can be looked up from cell libraries and used to back compute $\sigma_{short-circuit}$ for a more accurate EM check. The value obtained for the capacitor load per power segment value is compared to the quotient of Imax divided by the product of the operating voltage, $V_{DD}$, and the operating frequency, f.

In some embodiments, the power per segment is used to assess whether the circuit performance is acceptable. For example, the power consumed by each of the cells 408 in a tile 406, which is coupled to a common power segment 400, is summed to determine the power per segment, $P_{perPowerSegment}$. The power per segment value is compared to the product of Imax and the operating voltage, $V_{DD}$, to determine if the circuit is susceptible to EM.

Method 210 moves to block 312 if one of the following conditions is not met:

$$I_{max} \leq \sum_i I_{average,i}$$

$$C_{load,perPowerSegment} \leq \frac{I_{max}}{f \cdot V_{DD}}$$

$$P_{perPowerSegment} \leq I_{max} \cdot V_{DD}$$

At block 312, one or more EM avoidance strategies are implemented. The one or more EM avoidance strategies can be selected from an EM avoidance strategy that is to be implemented at the placement block 208, at the power-grid enhancement block 210, and/or at the routing block 212.

One example of an EM avoidance strategy that can be implemented at placement block 208 includes moving a heavily loaded cell 408 to another power segment 400. For example, if cell 408-1 is heavily loaded, then cell 408-1 may be decoupled from its current power segment 400 and coupled to another power segment, such as a power segment disposed above cell 408-1 (not shown).

Another EM avoidance strategy that can be implemented at block 208 includes moving high fan-out nets in one cell 408 to another cell. For example, if cell 408-1 includes several nets having high current or power draws, then one or more of the nets can be moved from cell 408-1 to another cell, e.g., cell 408-2, cell 408-3, etc. Other EM avoidance strategies that can be implemented at block 208 include, but are not limited to, inserting one or more repeaters on wire-dominated nets and upsizing previous cells or inserting buffers on inputs to improve the input slew rate of the cell.

One example of an EM avoidance strategy that is implemented during power grid enhancement is increasing a width or effective width of a local power segment 400. Increasing the width of power segment 400 reduces the likelihood of EM occurring as will be understood by one of ordinary skill in the art. Another EM avoidance strategy implemented during power grid enhancement is adding power strips or segments in a perpendicular direction to the direction in which local power segment 400 extends. For example, the additional power strips or power segment can be disposed in a different conductive layer (e.g., M1, M2, etc.) than the conductive layer in which power segment 400 is disposed.

EM avoidance strategies can also be implemented during routing. For example, the routings for forming circuit devices and coupling circuit devices together can be optimized to be as short as possible. Shortening the routings reduces the capacitive loads on the outputs and also reduces the likelihood of EM migration.

Referring again to FIG. 3, method 210 moves back to block 310 where the average current of each power segment 400, Iavg, is compared to a maximum current, Imax, for a conductive wire. If Iavg for a power segment 400 is greater than or equal to Imax, then method 210 moves again to block 312 where one or more EM avoidance strategies are implemented. If Iavg is less than Imax, then method 210 moves to block 314 where method 210 ends.

Referring again to FIG. 2, method 200 moves to block 212 where routings for the devices and semiconductor circuit are mapped. Routing at block 212 is performed by router 120 of system 100.

At block 214, a data file, such as a graphic database system ("GDS") II file, including data representing the physical layout of the circuit is generated and stored in a non-transient machine readable storage 140. As will be understood by one of ordinary skill in the art, the data file is used by mask making equipment, such as an optical pattern generator, to generate one or more masks for the circuit.

At block 216, one or more masks for the semiconductor circuit are created based on the data file stored at block 216. In some embodiments, the semiconductor circuit is fabricated using the masks at block 216.

The disclosed systems and methods described above advantageously address electromigration ("EM") issues in semiconductor circuits as a multi-bin packing problem. By dividing a circuit into one or more local power segments each having a corresponding number of cells, output load based models and/or average power based models are used to estimate potential EM issues in the circuit. Once potential EM issues are identified, EM avoidance strategies can be implemented prior to routing and the creation of data files thereby enabling faster circuit design and testing.

In some embodiments, a method includes identifying at least one local power segment of a circuit, estimating at least one performance parameter of the at least one power segment based on a computer-based simulation of the circuit, and changing a design of the circuit based on at least one electromigration avoidance strategy if the at least one parameter is greater than or equal to a threshold value. A data file representing the circuit is stored if the at least one parameter is less than the threshold value.

In some embodiments, a system includes a non-transient storage medium and a processor coupled to the non-transient storage medium. The processor is configured to identify at least one local power segment of a circuit, estimate at least one parameter of the at least one power segment based on a simulation of the circuit, and change a design of the circuit based on at least one electromigration avoidance strategy if the at least one parameter is greater than or equal to a threshold value. A data file representing the circuit is stored in the non-transient storage medium if the at least one parameter is less than the threshold value.

In some embodiments, a non-transient storage medium is encoded with program code, wherein when the program code is executed by a processor, the processor performs a method. The method includes identifying at least one local power segment of a circuit, estimating at least one parameter of the at least one power segment based on a simulation of the circuit, and changing a design of the circuit based on at least one electromigration avoidance strategy if the at least one parameter is greater than or equal to a threshold value. A data file representing the circuit is stored if the at least one parameter is less than the threshold value.

The present invention can be embodied in the form of methods and apparatus for practicing those methods. The present invention can also be embodied in the form of program code embodied in tangible media, such as secure digital ("SD") cards, USB Flash drives, CD-ROMs, DVD-ROMs, Blu-ray disks, hard drives, or any other non-transient machine-readable storage medium, wherein, when the program code is loaded into and executed by a machine, such as a computer, the machine becomes an apparatus for practicing the invention. The present invention can also be embodied in the form of program code, for example, whether stored in a non-transient storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the systems and methods have been described in terms of exemplary embodiments, they are not limited thereto. Rather, the appended claims should be construed broadly, to include other variants and embodiments of the systems and methods, which may be made by those skilled in the art without departing from the scope and range of equivalents of the systems and methods.

What is claimed is:

1. A method, comprising:
   identifying at least one local power segment of a circuit;
   dividing an area occupied by devices supplied by the at least one local power segment into a plurality of cells, wherein each cell has a respective power consumption and a respective area that is based on the respective power consumption such that the power consumptions of each of the plurality of cells are approximately equal;
   estimating at least one performance parameter of the at least one local power segment based on a computer-based simulation of the circuit;
   making a design change in the circuit based on at least one electromigration avoidance strategy if the at least one parameter is greater than or equal to a threshold value, wherein the design change affects at least one cell of the plurality of cells; and
   storing a data file representing the circuit if the at least one parameter is less than the threshold value.

2. The method of claim 1, wherein the at least one parameter includes a current for the at least one local power segment.

3. The method of claim 2, wherein the current for the at least one local power segment includes a sum of an average current for each cell of the at least one local power segment.

4. The method of claim 1, wherein the at least one parameter includes a power for the least one local power segment.

5. The method of claim 1, wherein the at least one parameter includes a capacitance of a load coupled to the at least one local power segment.

6. The method of claim 1, wherein a local power segment is identified as a portion of a power supply line disposed between adjacent vias that couple the power supply line to power supply lines disposed in a higher conductive layer.

7. The method of claim 1, further comprising:
   determining a floor plan for the circuit based on a netlist;
   determining a power plan for the circuit based on the netlist; and
   determining a placement for functional components of the circuit.

8. The method of claim 1, further comprising fabricating at least one mask for the circuit based on the data file.

9. A system, comprising:
   a non-transitory storage medium; and
   a processor coupled to the non-transient storage medium, the processor configured to:
      identify at least one local power segment of a circuit;
      divide an area occupied by devices supplied by the at least one local power segment into a plurality of cells, wherein each cell has a respective power consumption and a respective area that are based on the respective power consumption such that power consumptions of each of the plurality of cells are approximately equal;
      estimate at least one parameter of the at least one local power segment based on a simulation of the circuit;
      make a design change in the circuit based on at least one electromigration avoidance strategy if the at least one parameter is greater than or equal to a threshold value, wherein the design change affects at least one cell of the plurality of cells; and
      store a data file representing the circuit in the non-transient storage medium if the at least one parameter is less than the threshold value.

10. The system of claim 9, wherein the at least one parameter includes a current for the at least one local power segment.

11. The system of claim 10, wherein the current for the at least one local power segment includes a sum of an average current for each cell of the at least one local power segment.

12. The system of claim 9, wherein the at least one parameter includes a power for the least one local power segment.

13. The system of claim 9, wherein the at least one parameter includes a capacitance of a load coupled to the at least one local power segment.

14. The system of claim 9, wherein a local power segment is identified as a portion of a power supply line disposed between adjacent vias that couple the power supply line to power supply lines disposed in a higher conductive layer.

15. The system of claim 9, wherein the processor is configured to
    determine a floor plan for the circuit based on a netlist;
    determine a power plan for the circuit; and
    determine a placement for functional component of the circuit.

16. A non-transitory storage medium encoded with program code, wherein when the program code is executed by a processor, the processor performs a method, the method comprising:
    identifying at least one local power segment of a circuit;
    dividing an area occupied by devices supplied by the at least one local power segment into a plurality of cells, wherein each cell has a respective power consumption and a respective area that is based on the respective power consumption such that power consumption of each cell of the plurality of cells are approximately equal;
    estimating at least one parameter of the at least one local power segment based on a simulation of the circuit;
    making a design change in the circuit based on at least one electromigration avoidance strategy if the at least one parameter is greater than or equal to a threshold value, wherein the design change affects at least one cell of the plurality of cells; and
    storing a data file representing the circuit if the at least one parameter is less than the threshold value.

17. The non-transitory storage medium of claim 16, wherein the at least one parameter includes one of a current or a power for the at least one local power segment.

18. The non-transitory storage medium of claim 17, wherein the current for the at least one local power segment includes a sum of an average current for each cell of the at least one local power segment.

19. The non-transitory storage medium of claim 16, wherein the at least one parameter includes a power for the least one local power segment.

20. The non-transitory storage medium of claim 16, wherein a local power segment is identified as a portion of a power supply line disposed between adjacent vias that couple the power supply line to power supply lines disposed in a higher conductive layer.

* * * * *